(12) United States Patent
Shen et al.

(10) Patent No.: US 7,852,774 B2
(45) Date of Patent: Dec. 14, 2010

(54) USER DATAGRAM PROTOCOL TRACEROUTE PROBE EXTENSION

(75) Inventors: Naiming Shen, Santa Clara, CA (US); Enke Chen, San Jose, CA (US); Carlos M. Pignataro, Raleigh, NC (US); Rajiv Asati, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 390 days.

(21) Appl. No.: 11/946,673

(22) Filed: Nov. 28, 2007

(65) Prior Publication Data

US 2009/0135728 A1    May 28, 2009

(51) Int. Cl.
*H04L 12/26* (2006.01)
(52) U.S. Cl. ...................................... 370/241
(58) Field of Classification Search ................. 370/241, 370/254, 255, 351, 389, 392, 395.52; 709/227, 709/238, 245
See application file for complete search history.

(56) References Cited

U.S. PATENT DOCUMENTS

| | | | | |
|---|---|---|---|---|
| 6,363,056 B1 * | 3/2002 | Beigi et al. | ................. | 370/252 |
| 6,662,223 B1 * | 12/2003 | Zhang et al. | ................. | 709/224 |
| 6,704,786 B1 * | 3/2004 | Gupta et al. | ................. | 709/228 |
| 6,718,382 B1 * | 4/2004 | Li et al. | ...................... | 709/224 |
| 6,940,821 B1 * | 9/2005 | Wei et al. | .................... | 370/244 |
| 7,152,105 B2 * | 12/2006 | McClure et al. | ............. | 709/224 |
| 7,554,983 B1 * | 6/2009 | Muppala | ..................... | 370/392 |
| 7,583,667 B2 * | 9/2009 | Adhikari et al. | ............. | 370/389 |
| 2007/0157303 A1 * | 7/2007 | Pankratov | ..................... | 726/11 |

OTHER PUBLICATIONS

Stevens, Ping Program, TCP/IP illustrated, vol. 1, Addison-Wesley, Apr. 2000, 16 pages.*

* cited by examiner

*Primary Examiner*—Dmitry H Levitan
(74) *Attorney, Agent, or Firm*—Schwegman, Lundberg & Woessner, P.A.

(57) ABSTRACT

The embodiments described herein provide methods and apparatuses for implementing a User Datagram Protocol traceroute probe extension. In an example embodiment, a request to transmit a User Datagram Protocol (UDP) packet to a remote destination is received. A probe header and a probe data element is then stored in a data field of the UDP packet. The UDP packet is then transmitted toward the remote destination. In an example embodiment, a User Datagram Protocol (UDP) packet is received and it is determined whether the UDP packet includes a probe data structure. When the determination is affirmative, the probe data structure is processed.

19 Claims, 8 Drawing Sheets

USER DATAGRAM PROTOCOL TRACEROUTE PROBE EXTENSION

FIELD

The present disclosure relates generally to computer networks. In one example embodiment, the disclosure relates to a User Datagram Protocol (UDP) traceroute probe extension.

BACKGROUND

Traceroute is a computer network tool used to discover a path a packet takes from an originating host to a remote host. Traceroute can be used on Internet Protocol (IP) networks (e.g., IPv4 or IPv6). Traceroute is typically implemented by sending a series of messages addressed to a remote destination beginning with a "time-to-live" (TTL) value of one in the first message and incrementing the TTL in each successive message until the remote destination is reached. When a message passes through a network device, such as a router or a gateway, the TTL value is decremented by one before forwarding the message to the next network device to keep it moving on its way to the remote destination. When the TTL becomes zero, the receiving network device will discard the message and respond with an error message indicating that the message's time to live has expired. When a message reaches its remote destination, different techniques can be used to indicate that the message's destination has been reached. For example, a UDP-based traceroute tool may use an unusually high port number so that instead of a "time exceeded" error message, a "destination unreachable code" or "port unreachable code" error message is returned. Traceroute can capture and organize the error messages to display a route through the network to the remote destination.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of an example embodiment of the present disclosure. It will be evident, however, to one skilled in the art that the present disclosure may be practiced without these specific details.

Overview

The embodiments described herein provide methods and apparatuses for implementing a User Datagram Protocol traceroute probe extension. In an example embodiment, a request to transmit a User Datagram Protocol (UDP) packet to a remote destination is received. A probe header and a probe data element is then stored in a data field of the UDP packet. The UDP packet is then transmitted toward the remote destination. In an example embodiment, a User Datagram Protocol (UDP) packet is received and it is determined whether the UDP packet includes a probe data structure. When the determination is affirmative, the probe data structure is processed.

Example Embodiments

Figure 1:
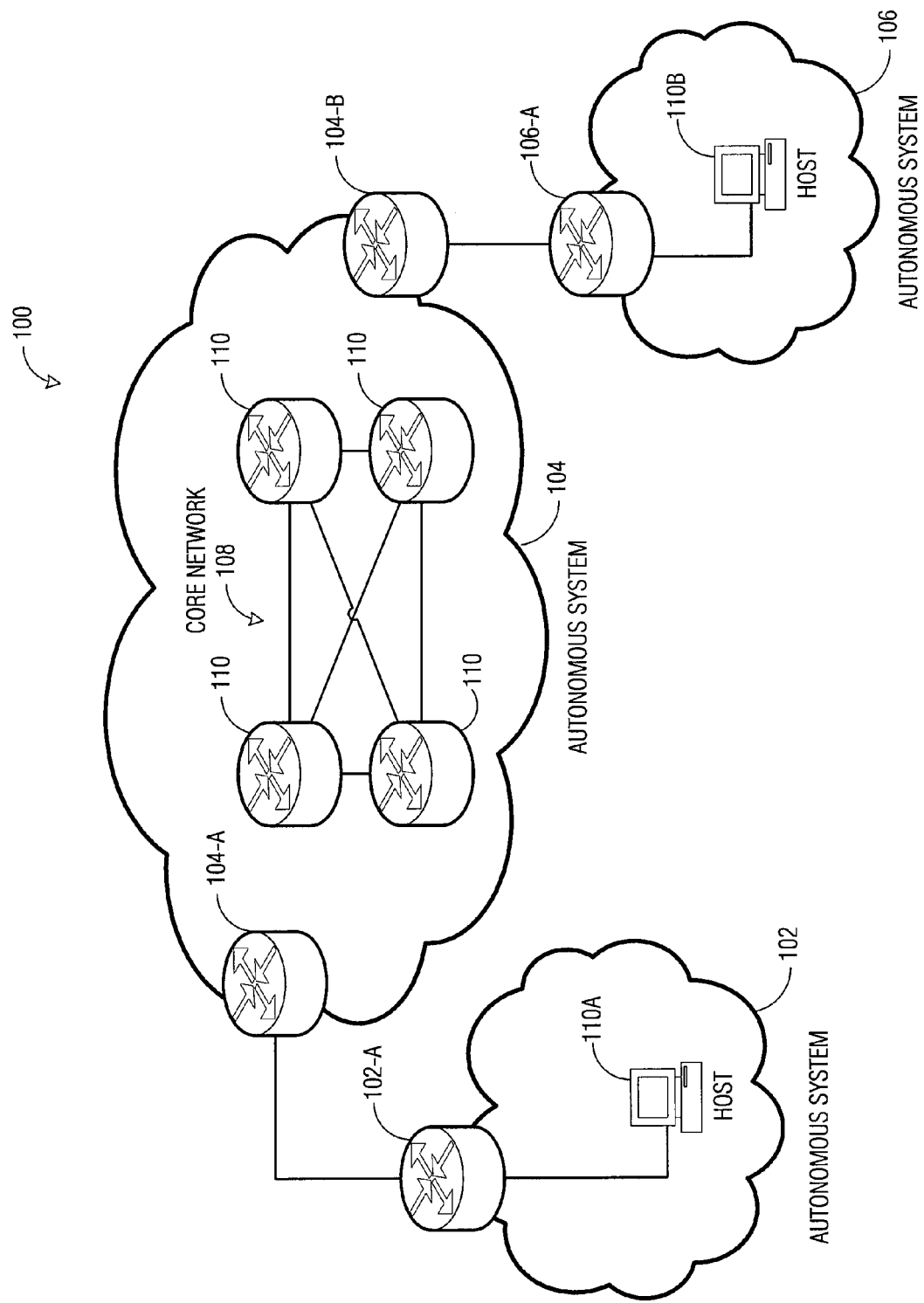
FIG. 1 is a diagram of a networked system, in accordance with an example embodiment.

FIG. 1 is a diagram of a networked system 100, in accordance with an example embodiment. The networked system 100 may include network devices, which may include a device at the edge of a particular network (e.g., a network edge). In the example illustrated, a border network appliance 102-A, which is associated with a first autonomous system (AS) 102, is connected to a border network appliance 104-A, which is associated with a second AS 104. A second border network appliance 104-B is also associated with the second AS 104 and connected to a border network appliance 106-A, which is associated with a third AS 106. The border network appliance 102-A, 104-A, 104-B, 106-A, may include devices such as routers, switches, or other devices that reside on the networked system 100 that analyze or direct network traffic. The border network appliance 104-A, 104-B are connected via a backbone or core network 108 that includes one or more backbone devices 110. The backbone devices 110 may include routers or other network traffic-handling devices. In addition, one or more hosts 112A, 112B may be connected to the border network appliances 102-A, 106-A, respectively. Other network configurations may be used without departing from the inventive subject matter described herein.

Examples of computer networks, such those illustrated in FIG. 1, include local area networks and wide area networks. A local area network connects the nodes over dedicated private communications links located in the same general physical location, such as a building or campus. A wide area network, on the other hand, connects geographically dispersed nodes over long-distance communications links, such as common carrier telephone lines, opticallightpaths, synchronous optical networks (SONET), or synchronous digital hierarchy (SDH) links. The Internet is an example of a wide area network that connects disparate networks throughout the world, providing global communication between nodes on various networks. The nodes communicate over computer network 100 by exchanging discrete frames or packets of data according to predefined protocols, such as Transmission Control Protocol/Internet Protocol (TCP/IP), User Datagram Protocol (UDP), Asynchronous Transfer Mode (ATM) protocol, Frame Relay protocol, Internet Packet Exchange (IPX) protocol, interior gateway protocol (IGP), and other protocols.

Figure 2A:
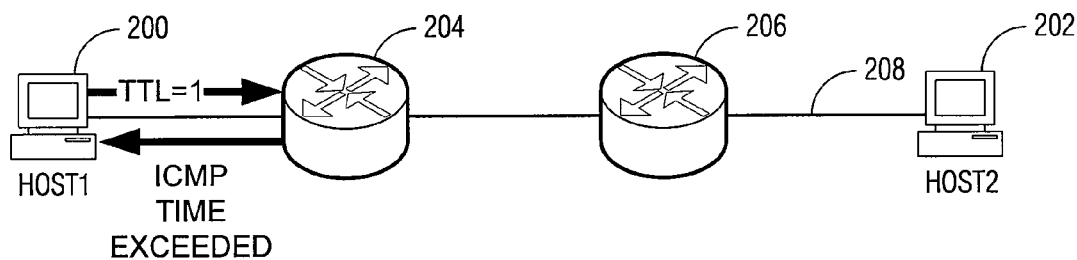
FIGS. 2A-2C are schematic diagrams, in accordance with an example embodiments, illustrating control and data flow between two hosts on a network.
Figure 2B:
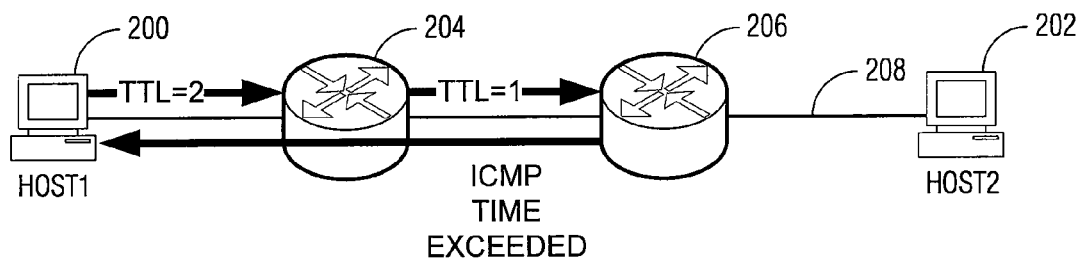
Figure 2C:
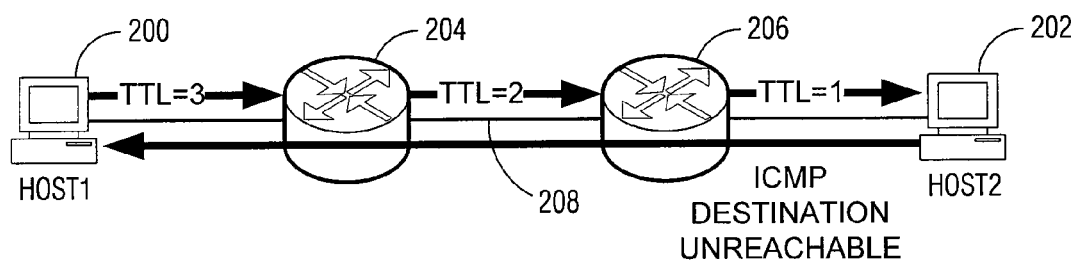

FIGS. 2A-2C are schematic diagrams, in accordance with example embodiments, illustrating control and data flow between two hosts on a network. As shown in FIG. 2, the system includes a first host (HOST1) 200, a second host (HOST2) 202, a first network device (e.g., router) 204, and a second network device 206, all connected via a network 208. In the example shown, a traceroute is initiated from HOST1 200. A traceroute packet may be addressed to a remote destination node (e.g., HOST2 202) to allow a user or process to discover the network path between the originating node (e.g., HOST1 200) and the destination node. The traceroute packet includes a time-to-live (TTL) value of one. At the first network device 204, the TTL is decremented by one to zero, causing the first network device 204 to transmit an error message. The type of error message sent may be dependent on the method of traceroute used. In an example, an Internet Control Message Protocol (ICMP) Time Exceeded message is transmitted by a network device that detects that the TTL has expired. In the example shown in FIG. 2A, HOST1 200 transmits a traceroute packet with a TTL of one to the first network device 204, which transmits an ICMP Time Exceeded message after decrementing the TTL and determining that the message's TTL has expired.

The next step in a traceroute process is illustrated in FIG. 2B, where HOST1 200 transmits a second traceroute packet with an incrementally higher TTL value (e.g., a TTL of two), which is processed by the first network device 204. The first network device 204 decrements the TTL to one and forwards the traceroute packet toward the ultimate destination (e.g., HOST2 202). The second network device 206, which is the next hop in the network path from HOST1 200 to HOST2 202 in this example, receives the traceroute packet and processes the packet. In this situation, the second network device 206 decrements the TTL to zero and transmits an ICMP error message (e.g., ICMP Time Exceeded message) to the originator of the traceroute packet (e.g., HOST1 200).

FIG. 2C illustrates the last step in this illustrative traceroute process. As described with regard to the previous step illustrated in FIG. 2B, the originating host (e.g., HOST1 200), increments the TTL of the traceroute packet and transmits the traceroute packet toward the remote destination (e.g., HOST2 202). At the first network device 204, the TTL is decremented and analyzed. Because the TTL is not reduced to zero, the traceroute packet is forwarded using network routing processes. In the example shown, the next hop in the network path is the second network device 206. When the traceroute packet is received at the second network device 206, the second network device 206 decrements the TTL and analyzes the resulting value. In this case, the TTL is reduced to one, so the second network device 206 does not raise an ICMP error, and forwards the traceroute packet to the destination (e.g., HOST2 202). In an example embodiment, the traceroute packet is addressed to a (presumably) unknown or unused destination UDP port. As such, when the traceroute packet reaches the destination node, a different ICMP message may be transmitted in response. In the example illustrated, an ICMP Destination Unreachable (with port unreachable code) message is transmitted in response to the traceroute packet.

The originating host (e.g., HOST1) may use the responsive messages (e.g., ICMP Time Exceeded or ICMP Destination Unreachable messages) to determine network latency times, discover network paths to a destination node, or obtain other information, such as data included in a multi-part ICMP message used for troubleshooting network issues. Traceroute data and processes may also be used in conjunction with other network analysis tools, such as ping, to further expose network information, such as network topology, network structure, node identification, or the like.

Figure 3:
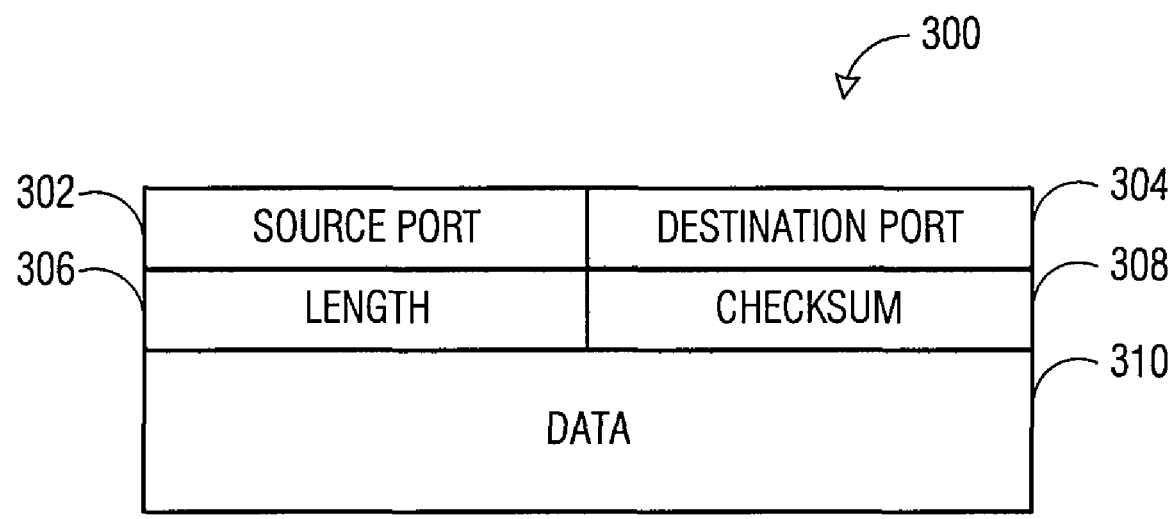
FIG. 3 is a diagram, in accordance with an example embodiment, illustrating a user datagram protocol (UDP) header structure and UDP data.

FIG. 3 is a diagram, in accordance with an example embodiment, illustrating a user datagram protocol (UDP) packet structure 300. The UDP packet structure 300 includes a source port field 302, a destination port field 304, a length field 306, a checksum field 308, and a data field 310. The source port field 302 is an optional field that, when used, indicates the port of the send process and may be assumed to be the port to which a reply should be addressed in the absence of any other information. If not used, a value of zero may be provided. The destination port field 304 may be used to indicate a particular internet destination address. The length field 306 includes the length in octets of the datagram, including the header information (302, 304, 306, 308) and the data field 310. The checksum field 308 includes a checksum of data from the IP header, the UDP header, and the UDP data, according to the User Datagram Protocol. The data field 310 includes the payload data to be delivered to a destination.

In many applications of traceroute, the data field 310 of the UDP packet is irrelevant because the key information of a traceroute packet is the Internet Protocol (IP) TTL value. In some example embodiments, the data field 310 may be used to extend the functionality of traceroute by including information in the data field 310 to be read and used by recipient nodes in a network. The information may include informational data, identification data, command data, or request data, in various example embodiments. Thus, a method of providing extended functionality to traceroute includes appending data structures in the data field 310 and using an unused portion of the source port field 302 to indicate an offset to where the appended data structures begin in the data field 310. While many times, the data field 310 may not be used by the conventional traceroute process, using an offset value may be practical to avoid overwriting useable data in the data field 310. In an example embodiment, the offset value is provided in the source port field 302, as illustrated in FIG. 4.

Figure 4:
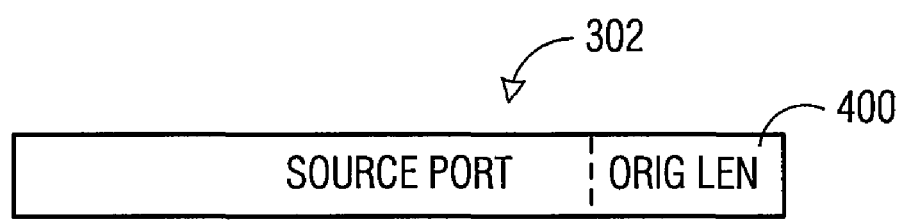
FIG. 4 is a diagram of a source port field, in accordance with an example embodiment.

FIG. 4 is a diagram of a source port field 302, in accordance with an example embodiment. An original length field 400, which is a portion of the source port field 302, may be used to indicate the original length of the data field 310 before any appended data structures (as described in more detail in FIGS. 5-10 below). In an example embodiment, the original length field 400 is defined as the lowest four bits of the UDP source port field 302. In an example embodiment, the four bits may represent 32-bit word ranges from 0x0 to 0xF. One or more values within the 32-bit word range may be reserved. In an example embodiment, the value 0xF is reserved. The reserved value may be used for proprietary signaling, future expansions of the protocol, or the like. In an embodiment, the value 0xF in the original length field 400 indicates that there are no appended data structures in the data field 310. Thus, the position the appended data structures may start from includes zero to fifty-six octets from the absolute beginning of the data field 310.

Figure 5:
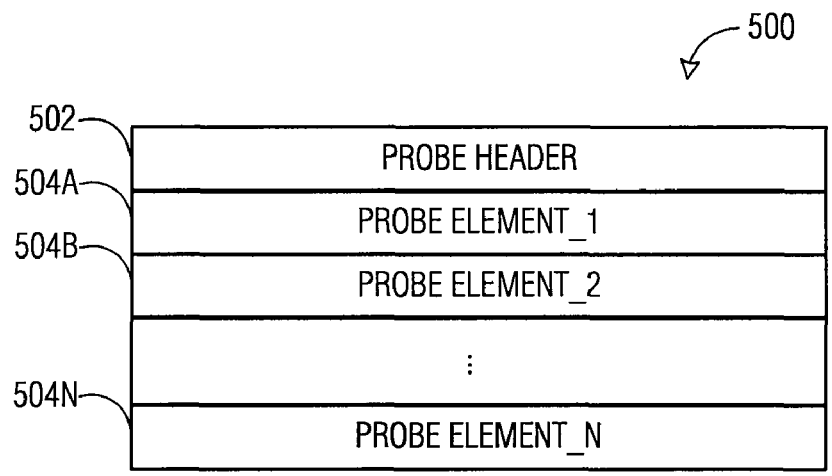
FIG. 5 is a diagram of a UDP probe data structure, in accordance with an example embodiment.

FIG. 5 is a diagram of a UDP probe data structure 500, in accordance with an example embodiment. As described above, the UDP probe data structure 500 may be included in the data field 310 of the UDP packet and start at the offset from the beginning of the data field 310 as specified in the original length field 400. The UDP probe data structure 500 includes a probe header 502 and one or more probe elements, 504A, 504B, . . . , 504N. Thus, the UDP probe data structure 500 includes a fully-described data object contained within the data field 310.

Figure 6:
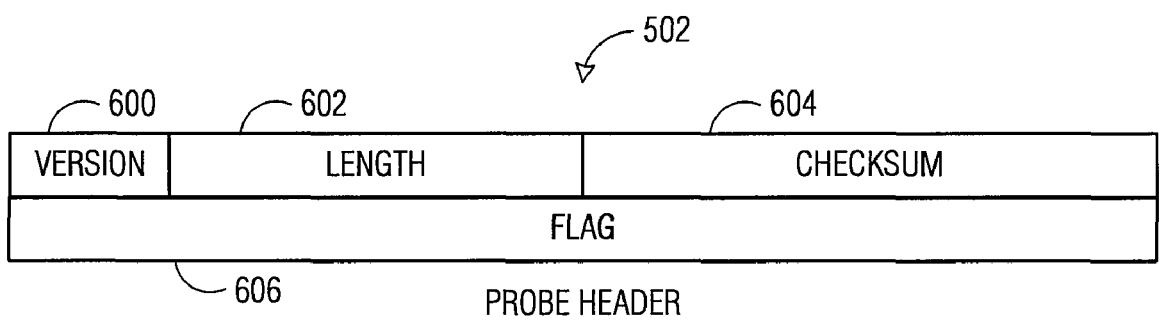
FIG. 6 is a diagram of a UDP probe header structure, in accordance with an example embodiment.

FIG. 6 is a diagram of a UDP probe header 502, in accordance with an example embodiment. In an example embodiment, the probe header 502 includes a version field 600, a length field 602, a checksum field 604, and a flag field 606. In an example embodiment, the version field 600 is four bits long and provides an indication of the version of the probe data structure 500. The length field 602 is twelve bits long and includes a total length of the probe data structure 500 measured in octets. The checksum field 604 is sixteen bits long and includes the one's complement of the one's complement sum of the probe data structure 500 with the value of zero used for the checksum field 604 when computing the checksum value. The traceroute flag field 606 includes a hexadecimal value of 0x54726163 in an example embodiment. The traceroute flag field 606 may be used as a method of identification or versioning, in some example embodiments.

Figure 7:
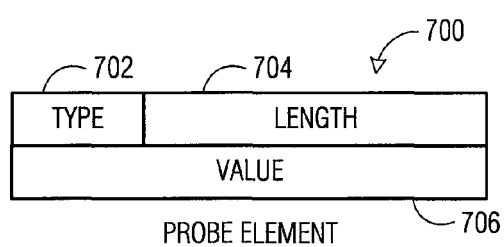
FIGS. 7-10 are diagrams of probe element data structures, in accordance with an example embodiments.
Figure 8:
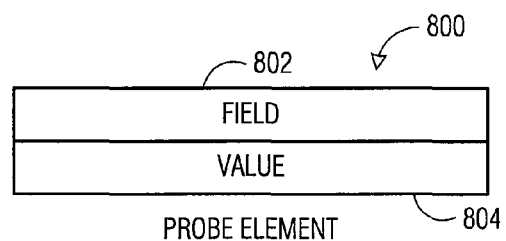
Figure 9:
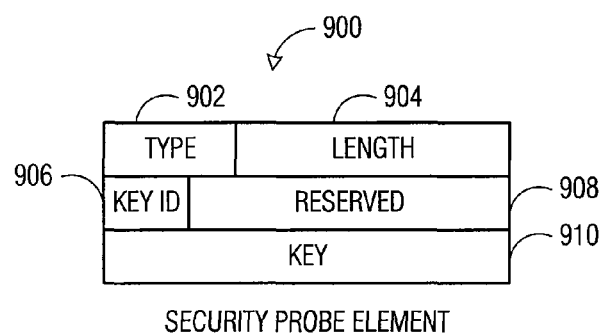
Figure 10:
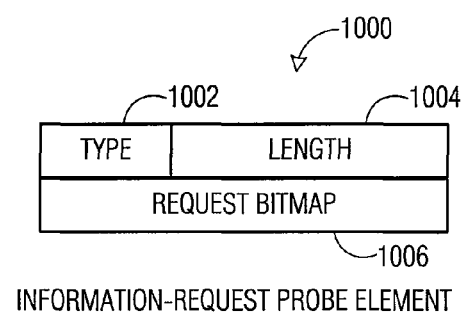

FIGS. 7-10 are diagrams of probe element data structures, in accordance with example embodiments. In an example embodiment, the probe element data structures represent probe element fields, such as those illustrated at 504A, 504B, . . . , 504N in FIG. 5. A probe element data structure may be formatted using a type-length-value tuple or a field-value tuple, in various embodiments. In the example illustrated in FIGS. 7-10, FIG. 7 illustrates a generic example of a type-length-value (TLV) structure, FIG. 8 illustrates a generic example of a field-value structure, FIG. 9 illustrates a specific example of a security TLV structure, and FIG. 10 illustrates a specific example of an information-request TLV structure.

FIG. 7 is a diagram according to an example embodiment that illustrates a TLV structure 700, in accordance with an example embodiment. The TLV structure 700 includes a type field 702, a length field 704, and a value field 706. In an example embodiment, the type field 702 and length field 704 are fixed-sized fields and the value field 706 is a variable-sized field, where the length field 704 is used to indicate the length of the value field 706. In an example embodiment, the value field 706 may be padded with a known value, such as zero or one, to align the size of the value field 706 to a particular boundary, such as a 4-octet boundary. By controlling the step-size of the value field 706, receiving processes or devices may be designed to read and parse the value field 706 or the TLV structure 700 more efficiently.

FIG. 8 is a diagram that illustrates a field-value structure 800, in accordance with an example embodiment. The field-value structure 800 includes a "field" field 802 and a value field 804. In an example embodiment, the "field" field 802 and the value field 804 are of fixed-sized, such as 16-bit or 32-bit fields.

FIG. 9 is a diagram that illustrates a security TLV structure 900, in accordance with an example embodiment. The security TLV structure 900 includes a type field 902, a length field 904, a key ID field 906, a reserved field 908, and a key field 910. In the example shown, the type field 902 is analogous to the type field 702 illustrated in the generic TLV structure 700 and the length field 904 is analogous to the length field 704 in the generic TLV structure 700. In addition, the combination of the key ID field 906, the reserved field 908, and the key field 910 are analogous to the value field 706 in the generic TLV structure 700.

In an example embodiment, the type field 902 includes a value of one indicating that the TLV structure is a security TLV structure 900.

The key ID field 906 may include a locally or globally unique identification of the key contained in the key field 910. This arrangement may allow multiple keys to be active and used simultaneously. In an example embodiment, the key ID field is a fixed-length field with a size of eight bits.

The key field 910 includes a locally or globally unique key. The unique key may be represented as a digital key value, in an example embodiment. In an example embodiment, the key field 910 is sixteen octets in length and includes an MD5 checksum for the entire traceroute IP/IPv6 packet. For example, when the key field 910 is calculated, the checksum fields in the IP header, UDP header 308, and probe header 502 are set to zero, and a shared MD5 key is stored in the key field 910.

The security TLV structure 900 may be used by a recipient node to authenticate a traceroute packet. For example, the recipient node may have access to one or more shared MD5 keys and when processing a traceroute packet that includes a security TLV structure 900, the recipient node may verify that a trusted party sent the traceroute packet before responding with ICMP replies, which may include sensitive information. The security TLV structure 900 may be included with an information-request TLV structure to allow a sender to request data and to allow a recipient to authenticate the sender before responding with the requested data.

The reserved field 908 is set aside for future use, in an example embodiment. For the purposes of performing the checksum for the key field 910, the reserved field 908 may be set to a known value, such as zero.

FIG. 10 is a diagram that illustrates an information-request TLV structure 1000, in accordance with an example embodiment. The information-request TLV structure 1000 includes a type field 1002, a length field 1004, and a value field, represented by the request bitmap field 1006. As with the security TLV structure 900 described above, the type and length fields (1002, 1004) are directly analogous to the type and length fields (702, 704) described with respect to FIG. 7. In an example embodiment, the type field 1002 includes a value of two indicating that the TLV structure is an information-request TLV structure 1000. In an example embodiment, the request bitmap field 1006 is used to indicate one or more information requests. For example, a request bitmap field 1006 may be a fixed-length field, such as 32-bits, where each bit position has a corresponding information item. A value of one in a particular position may be used to indicate a request for the information item, whereas a value of zero may be used to indicate that no request is being made. In an example embodiment, the bit positions of zero, one, two, and three, beginning from the rightmost bit in the field, are defined to correspond with information items, as illustrated in Chart A.

CHART A

| Bit Number | Information Item |
| --- | --- |
| 0 | Interface related attributes |
| 1 | MPLS label related attributes |
| 2 | IP/IPv6 address related attributes |
| 3 | Routing instance related attributes |

Interface related attributes may include data such as, for example, the interface name, the interface index of an incoming interface, or the interface that would have been designated as the outgoing interface. MPLS label related attributes may include data such as, for example, the incoming MPLS label stack of the packet that triggered an ICMP error. IP/IPv6 address related attributes may include data such as, for example, the IPv4 or IPv6 address of the incoming interface associated with the UDP packet that triggered the ICMP error. Routing instance related attributes may include data such as, for example, the Autonomous System Number, the Multi-Topology ID, the Open Shortest Path First (OSPF) Area ID, the Intermediate system to Intermediate system (IS-IS) Level, Interior Gateway Routing Protocol (IGRP) Autonomous System ID, Enhanced Interior Gateway Routing Protocol (EIGRP) Autonomous System Number, or the Virtual Router Redundancy Protocol (VRRP) Virtual Router Identifier. Using a known mapping of the request bitmap field 1006, a recipient node may respond accordingly.

Figure 11:
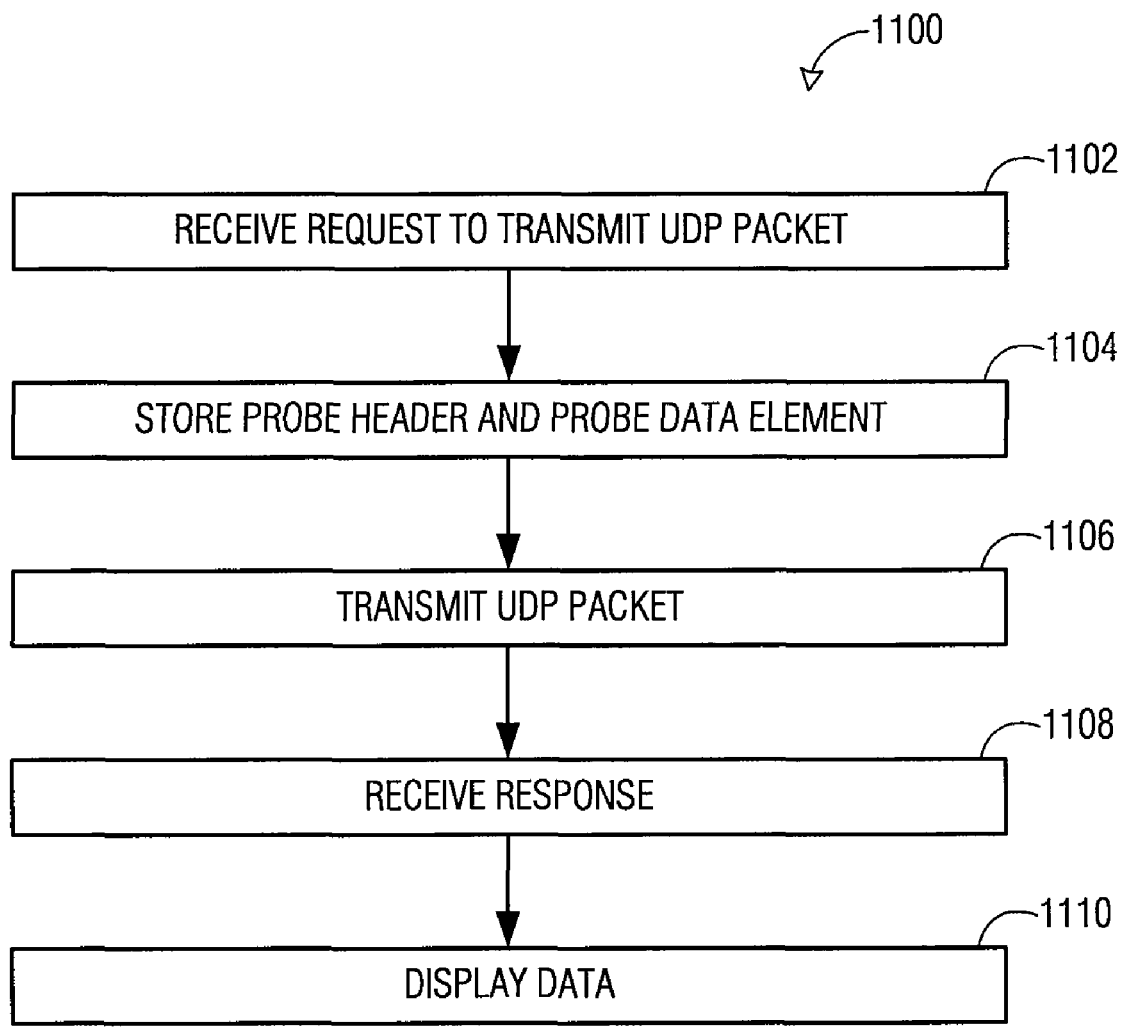
FIG. 11 is a flow diagram, in accordance with an example embodiment, illustrating a method of transmitting and receiving a UDP probe.

FIG. 11 is a flow diagram, in accordance with an example embodiment, illustrating a method 1100 of transmitting and receiving a UDP probe. At 1102, a request to transmit a UDP packet to a remote destination is received. The request may be associated with a traceroute process. At 1104, a probe header and one or more probe data elements are stored in the UDP packet. The probe header may be formatted using the structure described in FIG. 5 and the probe data elements may be formatted using one or more structures described in FIGS. 7-10. The one or more probe data elements may be inserted using an automatic or semi-automatic process, such as by a common security scheme in a network system. One or more probe data elements may also be inserted by one or more actions by a user, such as to request data from intermediate nodes or from a destination node. At 1106, the UDP packet is transmitted toward a destination network node. In a traceroute process, as described above, although the UDP packet is transmitted toward a destination network node, the traceroute process is designed such that the UDP packet will fail to reach the node one or more times, as expected. At 1108, a response is received. The response may be from an intermediate network node or the response may be from the destination node. At 1110, data associated with the response is displayed to a user. The data may include an information item requested using an information-request TLV, as described in FIG. 10 above. The data may also include the conventional traceroute data, such as network latency or identification of intermediate network nodes that are traversed on the path toward the destination node.

Figure 12:
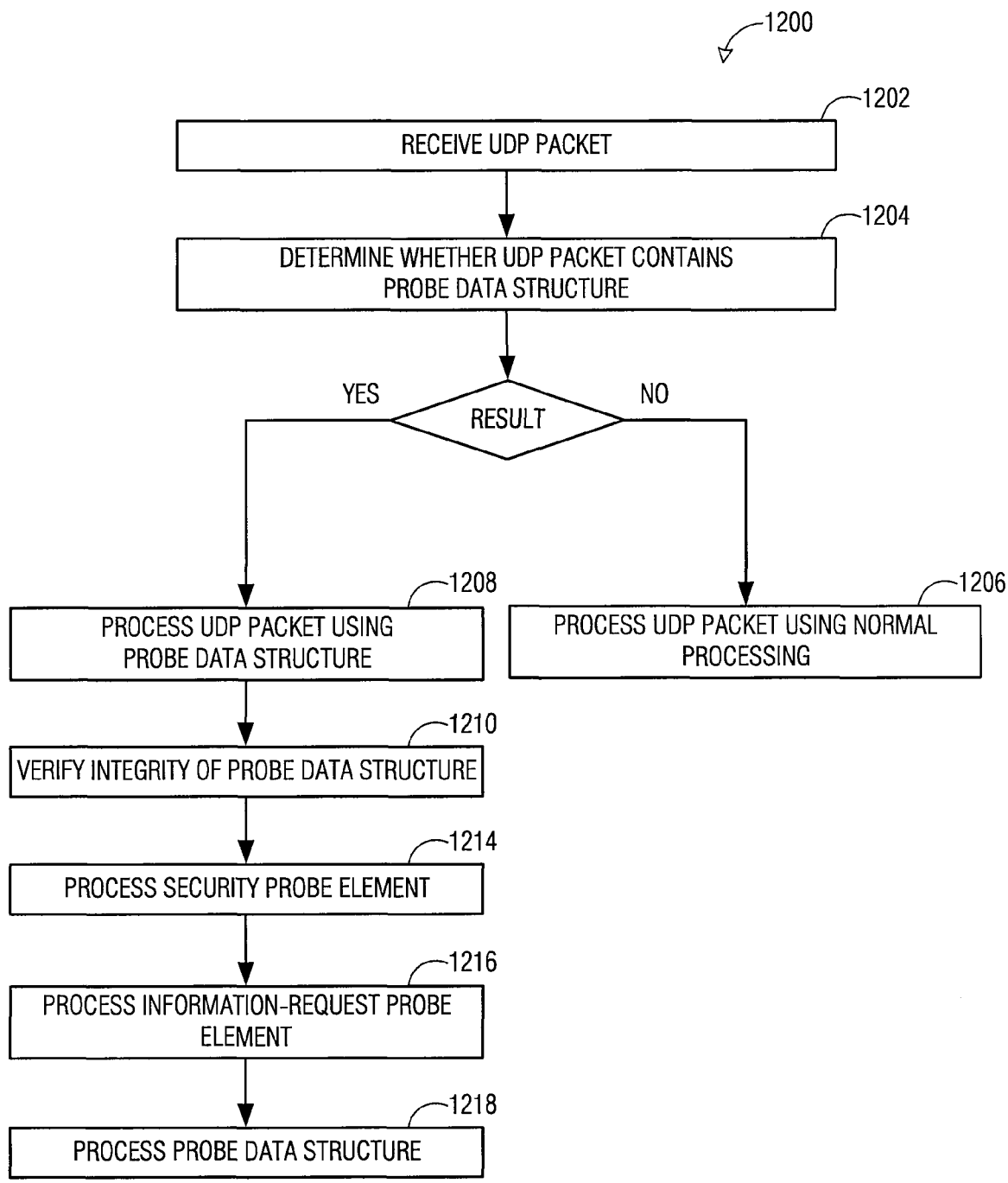
FIG. 12 is a flow diagram, in accordance with an example embodiment, illustrating a method of receiving and processing a response corresponding to a UDP probe.

FIG. 12 is a flow diagram, in accordance with an example embodiment, illustrating a method 1200 of receiving and processing a response corresponding to a UDP probe. At 1202, UDP packet is received. In an example embodiment, the UDP packet is analyzed to determine whether a time-to-live (TTL) parameter associated with the UDP packet has expired. If the TTL has expired, then processing continues at 1204. At 1204, whether the UDP packet contains a probe data structure is determined. In an example embodiment, the determination is made by analyzing the source port field 302 of the UDP packet structure 300. When the lowest four bits of the source port field 302 (also referred to as the original length field 400), indicate a value other than 0xF, then the method 1200 may determine that a probe data structure is present. When a value of 0xF is found in the original length field 400, then at 1206, the UDP packet is processed using normal packet processing. This may include decrementing the TTL value and returning an ICMP error message in accordance with conventional traceroute processing.

When the value of original length field 400 is something other than 0xF, then at 1208, the probe data structure contained in the UDP packet is processed. At 1210, the integrity of the probe data structure is verified. In an example embodiment, the method 1200 examines the version field 600, the flag field 606, and the checksum field 604 of the probe header 502. The method 1200 may then perform the checksum and compare the calculated checksum with the value in the checksum field 604 to verify the data structure.

At 1214, if a security probe element, such as the security TLV structure 900, is present in the probe data structure, then the security probe element is processed. In an example embodiment, the receiver node that is processing the probe data structure may access a locally stored shared key to validate the checksum in the security TLV structure. If the validation fails, then the receiving node may cease further processing of other probe elements in the UDP packet. In an example embodiment, the validation is performed when a local policy is set to require such validation.

In an example embodiment, authentication is required on the receiving node. When this is the case, in an example embodiment, the security probe element is expected to exist. If some or all of the security probe element is missing or malformed, then the authentication may fail and further processing of other probe elements in the UDP packet may be halted. In an example embodiment, an error message may be generated and returned to the sender of the UDP packet.

At 1216, if an information-request probe element, such as the information-request TLV structure 1000, is present in the probe data structure, then the information-request probe element is processed. In an example embodiment, the request bitmap included in the information-request probe element is parsed and the receiver node that is processing the probe data structure may make an attempt to retrieve, fetch, calculate, obtain, or otherwise provide the requested information in a responsive message. In an example embodiment, the requested information is sent using ICMP. For example, an ICMP multi-part message may be sent in response to an information-request probe element.

At 1218, the remaining portions of the probe data structure are processed. For example, when other TLV structures are defined and included, they may be processed in a similar manner to the security TLV and information-request TLV processing described herein.

Figure 13:
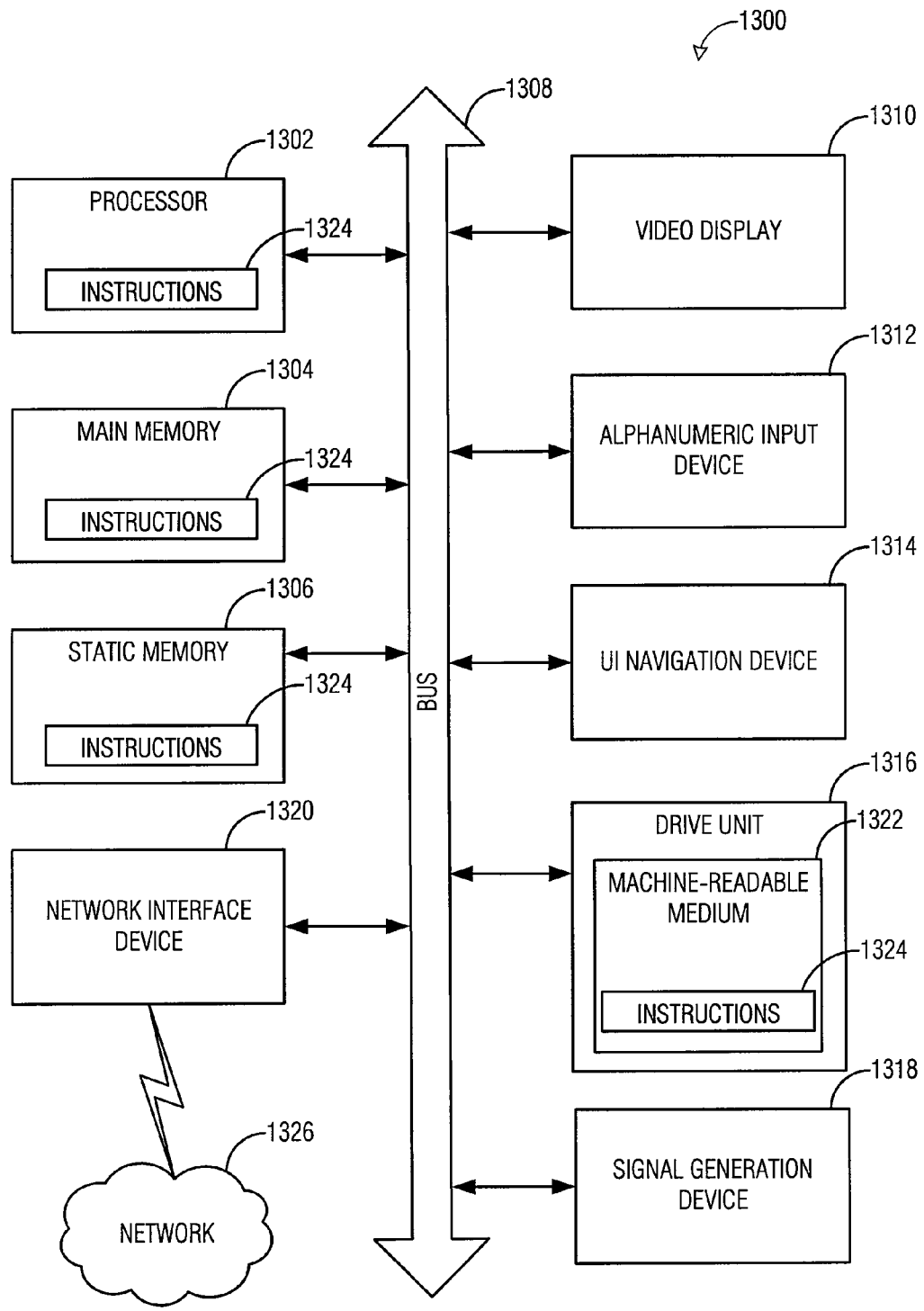
FIG. 13 is a block diagram of a machine, in accordance with an example embodiment, in the example form of computer system within which a set of instructions, for causing the machine to perform any one or more of the methodologies discussed herein, may be executed.

FIG. 13 is a block diagram of a machine, in accordance with an example embodiment, in the example form of computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1300 includes a processor 1302 (e.g., a central processing unit (CPU), a graphics processing unit (GPU) or both), a main memory 1304 and a static memory 1306, which communicate with each other via a bus 1308. The computer system 1300 may further include a video display unit 1310 (e.g., a plasma display, a liquid crystal display (LCD) or a cathode ray tube (CRT)). The computer system 1300 also includes an alphanumeric input device 1312 (e.g., a keyboard), a user interface (UI) navigation device 1314 (e.g., a mouse), a storage unit 1316, a signal generation device 1318 (e.g., a speaker) and a network interface device 1320.

The storage unit 1316 may include magnetic, optical, or other data storage media. The storage unit 1316 may include a device, such as a hard drive, an optical drive, a CD-ROM drive, a CD-RW drive, a DVD-ROM or RW drive, a solid state drive (SSD), a hybrid drive, a tape drive, a floppy drive, or the like. The storage unit 1316 may include machine-readable medium 1322 on which is stored one or more sets of instructions and data structures (e.g., software 1324) embodying or utilized by any one or more of the methodologies or functions described herein. The software 1324 may also reside, completely or at least partially, within the main memory 1304 and/or within the processor 1302 during execution thereof by the computer system 1300, where the main memory 1304 and the processor 1302 also constitute machine-readable, tangible media.

Software 1324 may further be transmitted or received over network 1326 via network interface device 1320 utilizing any one of a number of well-known transfer protocols (e.g., HTTP).

While machine-readable medium 1322 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. This disclosure is intended to cover any and all adaptations or variations of various embodiments. Combinations of the above embodiments, and other embodiments not specifically described herein, will be apparent to those of skill in the art upon reviewing the above description. For example, one functional, computational, or hardware module may be implemented as multiple logical modules, or several modules may be implemented as a single logical module. As another example, modules labeled as "first," "second," and "third," etc., may be implemented in a single module, or in some combination of modules, as would be understood by one of ordinary skill in the art.

In the appended claims, the terms "including" and "in which" are used as the plain-English equivalents of the respective terms "comprising" and "wherein," respectively. Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements or a particular ordering on their objects.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A method comprising:
    receiving a request to transmit a User Datagram Protocol (UDP) packet to a remote destination;
    storing a probe header and a probe data element in a data field of the UDP packet, wherein the probe header comprises a version field, a length field, a checksum field, and a flag field; and
    transmitting the UDP packet toward the remote destination.

2. The method of claim 1, wherein the probe data element comprises one of a type-length-value (TLV) element or a field-value element.

3. The method of claim 1, wherein the probe data element comprises one of an information-request TLV element or a digital key value.

4. The method of claim 1, further comprising:
    receiving a response corresponding with the UDP packet; and
    displaying data related to the response.

5. A method comprising:
    receiving a User Datagram Protocol (UDP) packet;
    determining whether the UDP packet includes a probe data structure;
        verifying an integrity of the probe data structure, wherein the verifying of the integrity of the probe data structure comprises:
        verifying that a version field in the probe data structure is valid;
        verifying that a probe flag field in the probe data structure is valid;
        verifying that a length field in the probe data structure is valid; and
        verifying a checksum value in the probe data structure; and
    processing the probe data structure when the determination is affirmative,
    wherein the determining of whether the UDP packet includes the probe data structure comprises determining whether a reserved field of the UDP packet indicates the existence of a probe data structure in the UDP packet.

6. The method of claim 5, wherein the processing of the probe data structure further comprises verifying a sender of the UDP packet by:
    extracting a digital key value from the probe data structure; and
    determining whether the digital key is a recognized digital key.

7. The method of claim 5, wherein the processing of the probe data structure further comprises:
    extracting an information-request probe element from the probe data structure;
    obtaining data associated with the information-request probe element; and
    transmitting a network message including the data associated with the information-request probe element to a sender of the UDP packet.

8. The method of claim 5, further comprising:
determining whether a time-to-live parameter associated with the UDP packet has expired; and
processing the probe data structure when the time-to-live determination is affirmative.

9. An apparatus comprising:
a processor; and
a memory in communication with the processor, the memory comprising instructions executable by the processor, which when executed, the processor being operable to:
receive a request to transmit a User Datagram Protocol (UDP) packet to a remote destination;
store a probe header and a probe data element in a data field of the UDP packet wherein the probe header comprises a version field, a length field, a checksum field, and a flag field; and
transmit the UDP packet toward the remote destination.

10. The apparatus of claim 9, wherein the probe data element comprises one of a type-length-value (TLV) element or a field-value element.

11. The apparatus of claim 9, wherein the probe data element comprises one of an information-request TLV element or a digital key value.

12. The apparatus of claim 9, further comprising instructions executable by the processor, which when executed, the processor being operable to:
receive a response corresponding with the UDP packet; and
display data related to the response.

13. An apparatus comprising:
a processor; and
a memory in communication with the processor, the memory comprising instructions executable by the processor, which when executed, the processor being operable to:
receive a User Datagram Protocol (UDP) packet;
determine whether the UDP packet includes a probe data structure; and
process the probe data structure when the determination is affirmative,
wherein the instructions to determine whether the UDP packet includes a probe data structure comprise instructions executable by the processor, which when executed, the processor being operable to:
determine whether a reserved field of the UDP packet indicates the existence of a probe data structure in the UDP packet; and
verify an integrity of the probe data structure, wherein the instructions to verify the integrity of the probe data structure comprise instructions executable by the processor, which when executed, the processor being operable to:
verify that a version field in the probe data structure is valid;
verify that a probe flag field in the probe data structure is valid; and
verify that a length field in the probe data structure is valid.

14. The apparatus of claim 13, wherein the instructions to verify the integrity of the probe data structure comprise instructions executable by the processor, which when executed, the processor being operable to verify a checksum value in the probe data structure.

15. The apparatus of claim 13, wherein the instructions to process the probe data structure further comprise instructions executable by the processor, which when executed, the processor being operable to verify a sender of the UDP packet.

16. The apparatus of claim 15, wherein the instructions to verify the sender of the UDP packet comprise instructions executable by the processor, which when executed, the processor being operable to:
extract a digital key value from the probe data structure; and
determine whether the digital key is a recognized digital key.

17. The apparatus of claim 13, wherein the instructions to process the probe data structure comprise instructions executable by the processor, which when executed, the processor being operable to extract an information-request probe element from the probe data structure.

18. The apparatus of claim 17, further comprising instructions executable by the processor, which when executed, the processor being operable to:
obtain data associated with the information-request probe element; and
transmit a network message including the data associated with the information-request element to a sender of the UDP packet.

19. The apparatus of claim 13, further comprising instructions executable by the processor, which when executed, the processor being operable to:
determine whether a time-to-live parameter associated with the UDP packet has expired; and
process the probe data structure when the time-to-live determination is affirmative.

* * * * *